(12) United States Patent
Kuttan et al.

(10) Patent No.: US 10,996,985 B2
(45) Date of Patent: May 4, 2021

(54) DYNAMIC QUEUE DEPTH MANAGEMENT WITH NON-VOLATILE MEMORY CONTROLLERS

(71) Applicant: HEWLETT PACKARD ENTERPRISE DEVELOPMENT LP, Houston, TX (US)

(72) Inventors: Harish Kuttan, Trichur (IN); Ashalatha Achepalli Maddappa, Bangalore (IN); Ravikanth Nalla, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 58 days.

(21) Appl. No.: 16/245,794

(22) Filed: Jan. 11, 2019

(65) Prior Publication Data

US 2020/0225988 A1 Jul. 16, 2020

(51) Int. Cl.
*G06F 9/48* (2006.01)
*G06F 9/455* (2018.01)
*G06F 9/54* (2006.01)
*G06F 9/50* (2006.01)

(52) U.S. Cl.
CPC ............ *G06F 9/4887* (2013.01); *G06F 9/455* (2013.01); *G06F 9/5038* (2013.01); *G06F 9/546* (2013.01)

(58) Field of Classification Search
CPC .................................................. G06F 9/4887
See application file for complete search history.

(56) References Cited

U.S. PATENT DOCUMENTS

| 5,426,736 | A | 6/1995 | Guineau |
| 9,239,786 | B2 | 1/2016 | Ki |
| 9,325,583 | B2 | 4/2016 | Muppirala |
| 10,365,845 | B1 * | 7/2019 | Foley ...................... G06F 3/064 |
| 10,635,315 | B1 * | 4/2020 | Armangau ............ G06F 3/0659 |

(Continued)

FOREIGN PATENT DOCUMENTS

WO WO-2016209268 12/2016

OTHER PUBLICATIONS

HP-UX 11i v3 Congestion control management for storage (Mar. 2010, herein after HP-UX) (Year: 2010).*

(Continued)

*Primary Examiner* — Sisley N Kim
(74) *Attorney, Agent, or Firm* — McDermott Will & Emery

(57) ABSTRACT

A system including a memory configured to store instructions, a host processor, an interface coupling the non-volatile memory and the host processor, and a device driver is provided. The device driver is configured to execute commands stored in the memory to retrieve a maximum queue size value from a hardware queue, wherein the hardware queue is associated with an interface between the host processor and a non-volatile memory, to determine multiple software queues associated with the hardware queue, to read an input/output count for a software queue selected from the software queues, to decrease the assigned queue depth, when the input/output count for the software queue is lower than an assigned queue depth, and to increase the assigned queue depth when the input/output count for the software queue is greater than the assigned queue depth.

16 Claims, 8 Drawing Sheets

(56) References Cited

U.S. PATENT DOCUMENTS

| | | | |
|---|---|---|---|
| 2004/0221290 A1* | 11/2004 | Casey | G06F 9/45558 |
| | | | 718/104 |
| 2009/0125666 A1 | 5/2009 | Freking | |
| 2015/0134857 A1 | 5/2015 | Hahn | |
| 2017/0075572 A1 | 3/2017 | Utevsky | |

OTHER PUBLICATIONS

HP StorageWorks XP12000 Disk Array Owner's Guide (May 2006, hereinafter HP) (Year: 2006).*

Bjorling et al., "Linux Block IO: Introducing Multi-queue SSD Access on Multi-core Systems", Proceedings of the 6th International Systems and Storage Conference, Jun. 30-Jul. 2, 2013, 10 pages.

HP, "HP-UX 11i v3 Congestion Control Management for Storage", Mar. 2010, pp. 1-17.

NVM Express, "NVM Express Revision 1.3", May 1, 2017, pp. 1-282.

Mohammed G. Khatib, "PCAP: Performance-aware Power Capping for the Disk Drive in the Cloud," Feb. 22, 2016, <https://www.usenix.org/system/files/conference/fast16/fast16-papers-khatib.pdf>.

* cited by examiner

DYNAMIC QUEUE DEPTH MANAGEMENT WITH NON-VOLATILE MEMORY CONTROLLERS

BACKGROUND

Non-volatile memory express (NVMe) is a commonly used interface specification for accessing non-volatile storage media hosted by computers executing multiple applications. NVMe provides the ability to include multiple command queues in a device driver, thereby allowing greater parallelism and reduced input/output (IO) overhead. Device drivers including controller hardware and associated software feature multiple hardware and software queues to exploit these capabilities. However, in dynamically changing IO workload scenarios, current technologies are unable to adjust the queues for device drivers, thereby resulting in numerous IO failures to running applications due to queue overload. These IO failures eventually cause a deterioration of application performance, overall system downgrade, and eventual failure.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1A:
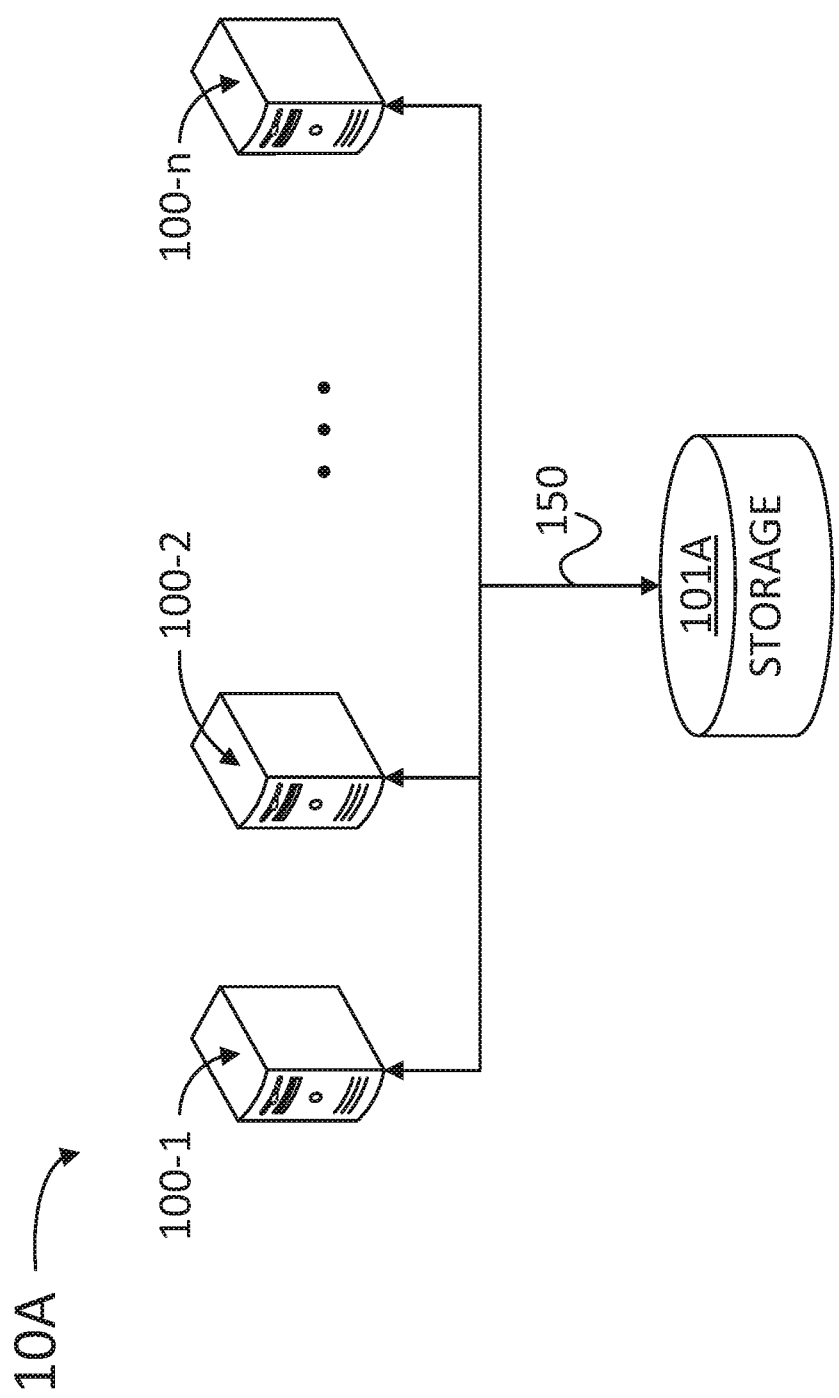
FIG. 1A is an architecture illustrating an example network with a shared storage suitable for a dynamic queue depth management in a non-volatile memory environment, according to certain aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments as disclosed herein provide a method to address "queue full" or IO overload issues by dynamically adjusting the size of IO queues (e.g., "queue depth") in NVMe controller interfaces. The queues may include software-defined IO queues associated with multiple name spaces or logical unit numbers (LUNs, in traditional storage). The size of the IO queues may be adjusted based on the IO load (e.g., the count of IO requests active on an NVMe name space), thus improving the IO performance by periodically monitoring the IO queues and efficiently utilizing the queue depths.

Embodiments as disclosed herein include a technical solution of the problem of fail back with IO errors due to queue full for applications running in computer systems, including computer network applications such as cloud computing and storage area networks (SANs). Embodiments herein solve the above technical problem arising in computer technology by dynamically managing the queue depth of NVMe devices handling multiple queues and multiple name spaces.

Some embodiments provide auto-adjusting and efficient utilization of software-defined queue depths, based on a continuous monitoring of the IO loads to each software-defined queue. This reduces IO failure and/or delay, resulting in greater IO performance of an NVMe controller interface. Moreover, in some embodiments, the monitoring of the software-defined IO queues and the adjustment of the queue depths is performed out of band, without impacting IO path, and thus causing no overhead in system resources.

In one embodiment of the present disclosure, a computer-implemented method is described that includes retrieving a maximum queue size value from a hardware queue. The hardware queue is associated with an interface between a host executing at least one application and a non-volatile memory. The computer-implemented method includes determining multiple software queues associated with the hardware queue, and reading, for a software queue selected from the software queues, an input/output count. The computer-implemented method also includes decreasing the assigned queue depth, when the input/output count for the software queue is lower than an assigned queue depth, and increasing the assigned queue depth when the input/output count for the software queue is greater than the assigned queue depth.

According to one embodiment, a system is described that includes a memory configured to store instructions, a host processor, and an interface coupling a non-volatile memory and the host processor. The system also includes a device driver configured to execute commands stored in the memory to cause the interface and the host processor to retrieve a maximum queue size value from a hardware queue, wherein the hardware queue is associated with an interface between the host processor and a non-volatile memory. The device driver also executes instructions to determine multiple software queues associated with the hardware queue, to read an input/output count for a software queue selected from the software queues, to verify that the input/output count for the software queue is lower than an assigned queue depth, to decrease the assigned queue depth, when the input/output count for the software queue is lower than an assigned queue depth, and to increase the assigned queue depth when the input/output count for the software queue is greater than the assigned queue depth According to one embodiment, a non-transitory, machine-readable medium is described that includes instructions, which when executed by one or more processors, cause a computer to perform a method, the method including retrieving a maximum queue size value from a hardware queue, wherein the hardware queue is associated with an interface between a host executing at least one application and a non-volatile memory. The method also includes determining multiple software queues associated with the hardware queue, reading, for a software queue selected from the software queues, an input/output count, and verifying that the input/output count for the software queue is lower than an assigned queue depth. The method also includes decreasing the assigned queue depth, when the input/output count for the software queue is lower than an assigned queue depth, and increasing the assigned queue depth when the input/output count for the software queue is greater than the assigned queue depth.

In yet other embodiment, a system is described that includes a means for storing commands and a means for executing the commands causing the system to perform a method that includes retrieving a maximum queue size value from a hardware queue, wherein the hardware queue is associated with an interface between a host executing at least one application and a non-volatile memory. The method also includes determining multiple software queues associated with the hardware queue, reading, for a software queue selected from the software queues, an input/output count, and verifying that the input/output count for the software queue is lower than an assigned queue depth. The method also includes decreasing the assigned queue depth, when the input/output count for the software queue is lower than an assigned queue depth, and increasing the assigned queue depth when the input/output count for the software queue is greater than the assigned queue depth.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1A is an architecture 10A illustrating an example network suitable for a dynamic queue depth management in a non-volatile memory environment, according to certain aspects of the disclosure. Architecture 10A may include multiple servers 100-1, 100-2, up to 100-$n$ (hereinafter, collectively referred to as "standalone servers 100") coupled through a network 150 to a common storage 101A. In some embodiments, architecture 10 may include a storage area network (SAN), wherein standalone servers 100 have access to storage 101A. Accordingly, storage 101A may include a non-volatile memory (NVM) as disclosed herein, and standalone servers 100 perform methods as disclosed herein. In some embodiments, standalone servers 100 may run multiple applications with each of the applications using a host controller interface to couple with storage 101A, according to embodiments disclosed herein. The host controller interface on each of standalone servers 100 may be configured to handle multiple namespace and multiple queue support in storage 101A, as disclosed herein. In some embodiments, standalone servers 100 may include one or more virtual machines (VM) configured in network 150. Accordingly, each of the namespaces or a group of namespaces may be associated with a VM.

Embodiments as disclosed herein dynamically tune the queue depth of queues associated with name space(s) in storage 101A across different standalone servers 100, VMs, and the like. Architecture 10A may include a cluster environment (e.g., cloud computing, and the like) where an NVMe host controller interface is shared among multiple nodes (e.g., servers 100) in the cluster, such as in an "NVMe over fabrics" (NVMeoF) implementation. In these configurations, embodiments as disclosed herein dynamically tune the queue depth of software-defined IO queues associated with the name space(s) of an NVMe host controller interface that is shared across different nodes in the cluster.

Figure 1B:
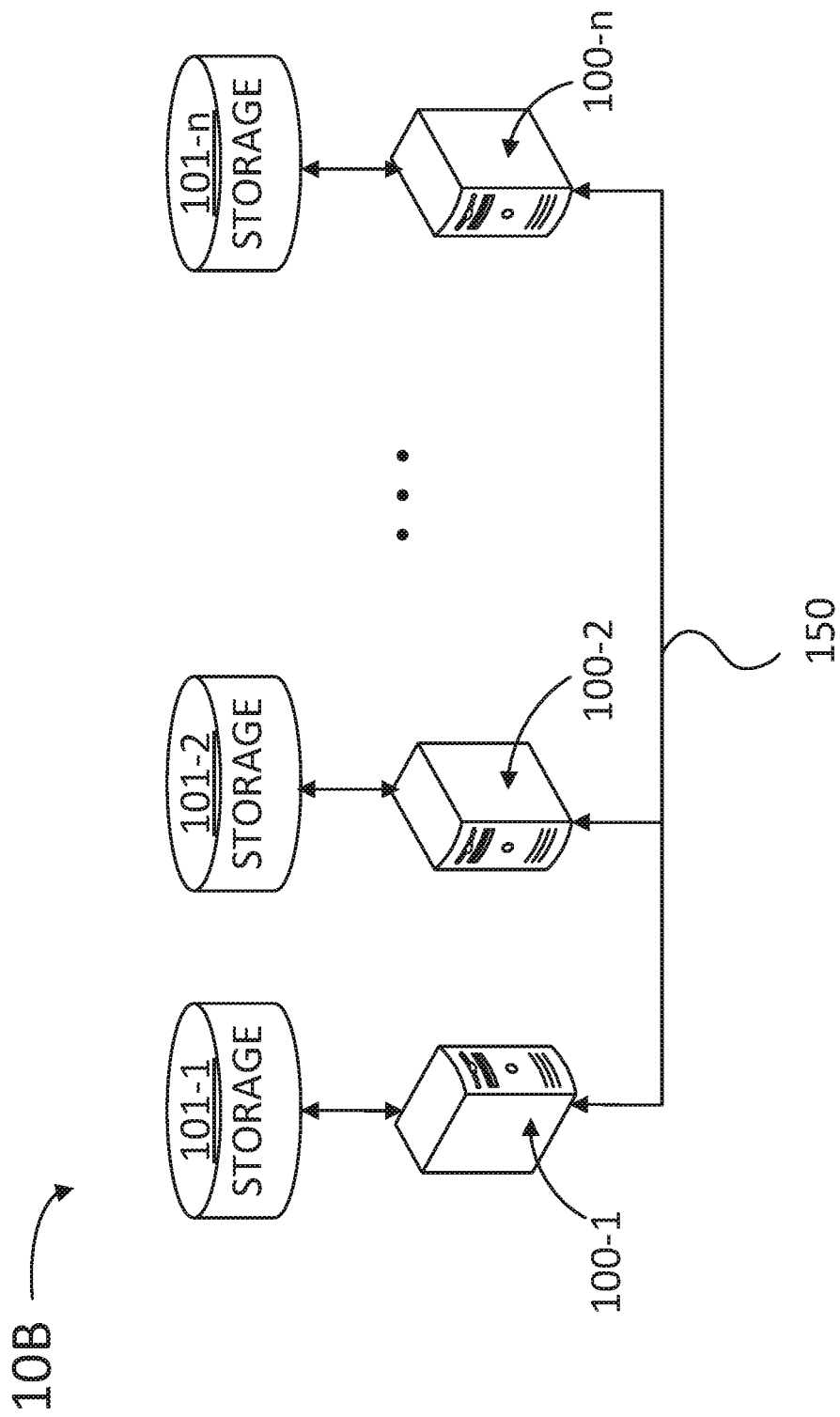
FIG. 1B is an architecture illustrating an example network with direct attached storage suitable for a dynamic queue depth management in a non-volatile memory environment, according to certain aspects of the disclosure.

FIG. 1B is an architecture 10B illustrating an example network with direct attached storage (DAS) suitable for a dynamic queue depth management in a non-volatile memory environment, according to certain aspects of the disclosure. Embodiments consistent with Architecture 10B include many NVMe implementations wherein each of servers 100 have local NVMe storage cards coupling to separate storage devices or systems 101-1, 101-2 through 101-$n$ (hereinafter, collectively referred to, together with storage 101A, as "storages 101").

Figure 2:
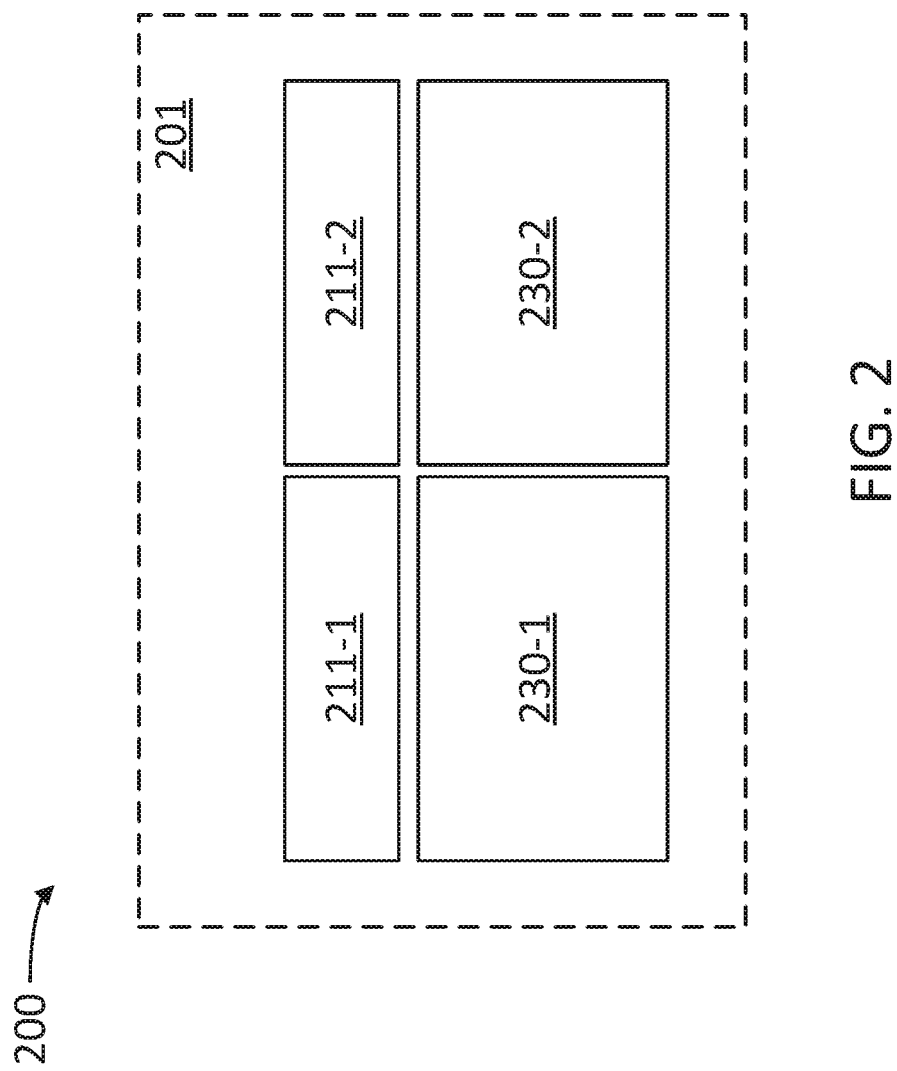
FIG. 2 is a block diagram illustrating a non-volatile controller configured to access two namespaces in a non-volatile memory, according to some embodiments.

FIG. 2 is a block diagram illustrating an NVMe controller 200 configured to access two name spaces 230-1 and 230-2 (hereinafter, collectively referred to as "name spaces 230") in a non-volatile memory, according to some embodiments. NVMe controller 200 includes multi-queue and multiple name space features to achieve greater IO performance.

A name space 230 is a collection of logical blocks that range from 0 to the capacity of the namespace minus 1. A name space ID (NSID) is an identifier used by a controller to provide access to a name space. NSID 211-1 is associated with name space 230-1, and NSID 211-2 is associated with name space 230-2. Hereinafter, NSID 211-1 and 211-2 will be collectively referred to as "NSIDs 211." The number of name spaces 230 serviced by NVMe controller 200 is based on the specific application or number of applications run by a host central processing unit (CPU) 222. Accordingly, in some embodiments, the number of name spaces 230 serviced by NVMe controller 200 may be more than two. CPU 222 may in turn include multiple CPU units (e.g., in a SAN configuration, and the like).

Figure 3:
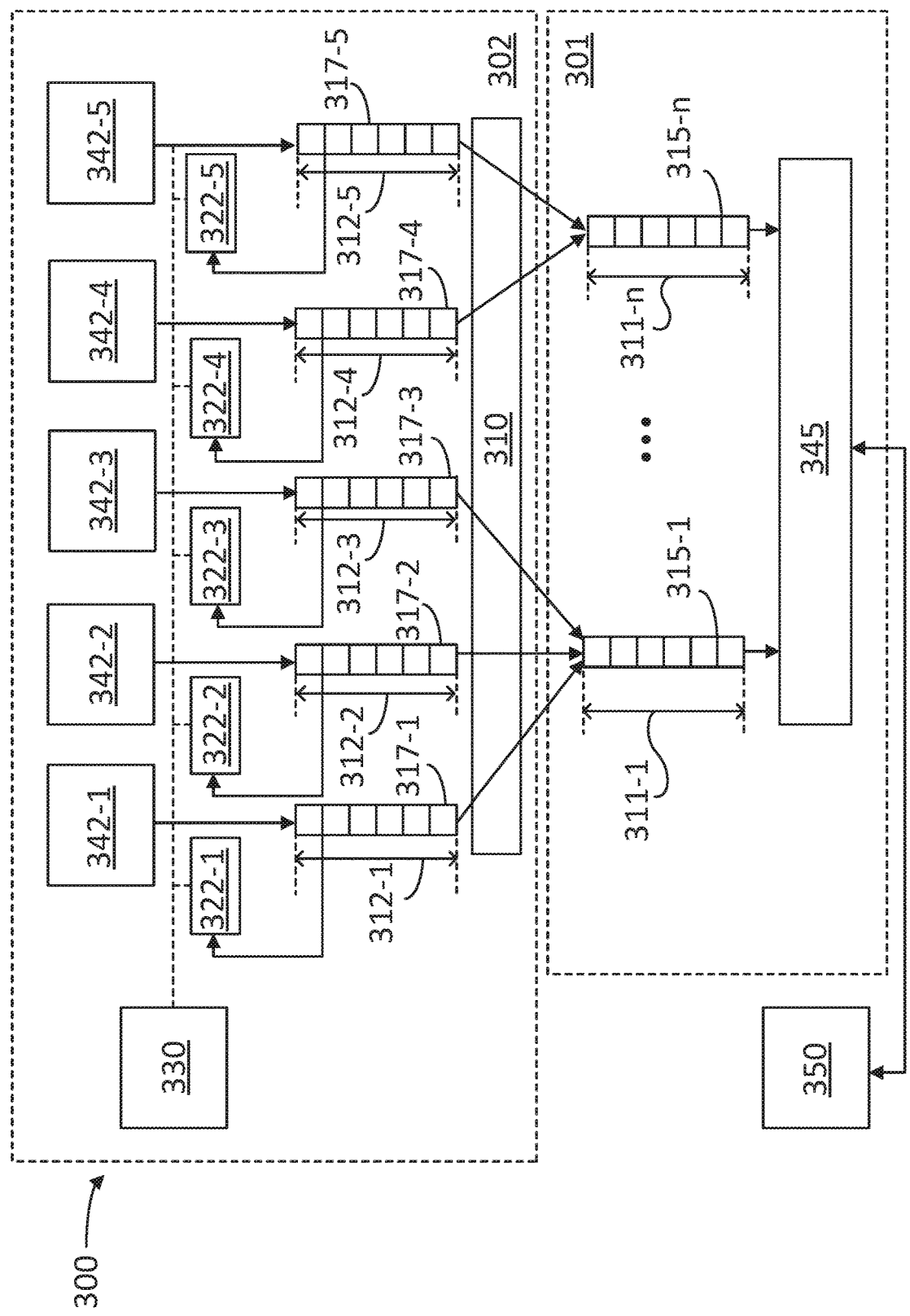
FIG. 3 is a diagram illustrating a two-layer, multi-queue support for non-volatile memory control, according to some embodiments.

FIG. 3 is a diagram illustrating a two-layer, multi-queue system 300 for controlling a non-volatile memory 350, according to some embodiments. An operating system (OS) layer 302 includes a memory 330 configured to store instructions, and multiple host processors (e.g., CPUs) 322-1, 322-2, 322-3, 322-4, and 322-5 (hereinafter, collectively referred to as "CPUs 322"). Each of CPUs 322 may be performing one or more applications 342-1, 342-2, 342-3, 342-4, and 342-5 (hereinafter, collectively referred to as "applications 342"). Each of applications 342 may access a specific namespace in non-volatile memory 350. Accordingly, multi-queue system 300 may be suited to parallelize IO requests through hardware queues 315-1 through 315-$n$ (hereinafter, collectively referred to as "hardware queues 315") where n is any integer number, thus achieving greater performance in networked architectures, such as SAN (cf. architecture 10). To further exploit the hardware features in multi-queue system 300, OS layer 302 includes multiple software queues 317-1, 317-2, 317-3, 317-4, and 317-5 (hereinafter, collectively referred to as "software queues 317"), each associated with different processors 322. For example, OS layer 302 in multi-queue system 300 may include a Linux block layer where one or more software queues 317 are mapped to a hardware queue 315 of NVMe controller 345. Software queues 317 are directed to hardware queues 315 by a device driver 310.

A hardware layer 301 includes an interface coupling non-volatile memory 350 with CPUs 322 (in operating system layer 302). Hardware layer 301 includes a NVMe controller 345 configured to execute commands stored in memory 330 to cause NVMe controller 345 and CPUs 322 to retrieve a maximum queue size value from hardware queue 315-1 through 315-n, wherein the hardware queue is associated with an interface between CPUs 322 and non-volatile memory 350. Device driver 310 also determines multiple software queues 317 associated with hardware queues 315. In some embodiments, each of hardware queues 315 may be associated with a selected group of software queues 317. For example, hardware queue 315-1 may be associated with software queues 317-1, 317-2, and 317-3, and hardware queue 315-n may be associated with software queues 317-4 and 317-5. In some embodiments, NVMe controller 345 also reads an input/output count for a software queue selected from one of software queues 317.

In some embodiments, applications 342 provide requests to name spaces in NVMe 350 through OS software layer 302 and hardware layer 301, including NVMe controller 345. The TO requests are queued to software IO queues 317 and mapped thereafter to hardware queues 315. Device driver 310 dispatches the IO requests to NVMe 350. In some embodiments, a single name space in NVMe 350 can be associated with multiple hardware queues 315. Further, in some embodiments, each of hardware queues 315 can be associated with multiple name spaces in NVMe 350.

Each of software queues 317 has a size, or queue depth, 312-1, 312-2, 312-3, 312-4, and 312-5 (hereinafter, collectively referred to as "queue depths 312"), respectively. Likewise, each of hardware queues 315 may be associated with a size, or queue depth, 311-1 and 311-2 (hereinafter, collectively referred to as "queue depths 311"), respectively. Queue depths 312 and 311 include a number of IO requests that can be processed by the queue. Verify that the input/output count for software queue 317 is lower than an assigned queue depth 312.

In some embodiments, queue depths 311 may be fixed according to the specifications of NVMe 350 and NVMe controller 345. In some embodiments, queue depths 312 may be initially set to an arbitrary default value, e.g., a same value across each of software queues 317. For example, and for illustrative purposes only, when the assigned queue depth 312-1 ('X') is higher than a count of IO requests issued to software queue 317-1 from application 342-1, then multi-queue system 300 determines that software queue 317-1 is underutilized and may dynamically reduce queue depth 312-1. When the count of IO requests from application 342-1 reaches 'X,' multi-queue system 300 may dynamically enlarge queue depth 312-1 to avoid an IO error fail back to application 342-1 (e.g., a "queue full" condition). More generally, one or more software queues 317 (handling certain name spaces) may receive a higher IO load and one or more software queues 317 may receive fewer IO loads. Accordingly, multi-queue system 300 is configured to adjust queue depths 312 according to dynamic changes in the IO load of the system, thus avoiding performance degradation during heavy IO load conditions. Thus, when the input/output count for the software queue is greater than the previously assigned queue depth 312, multi-queue system 300 increases the assigned queue depth 312.

Figure 4:
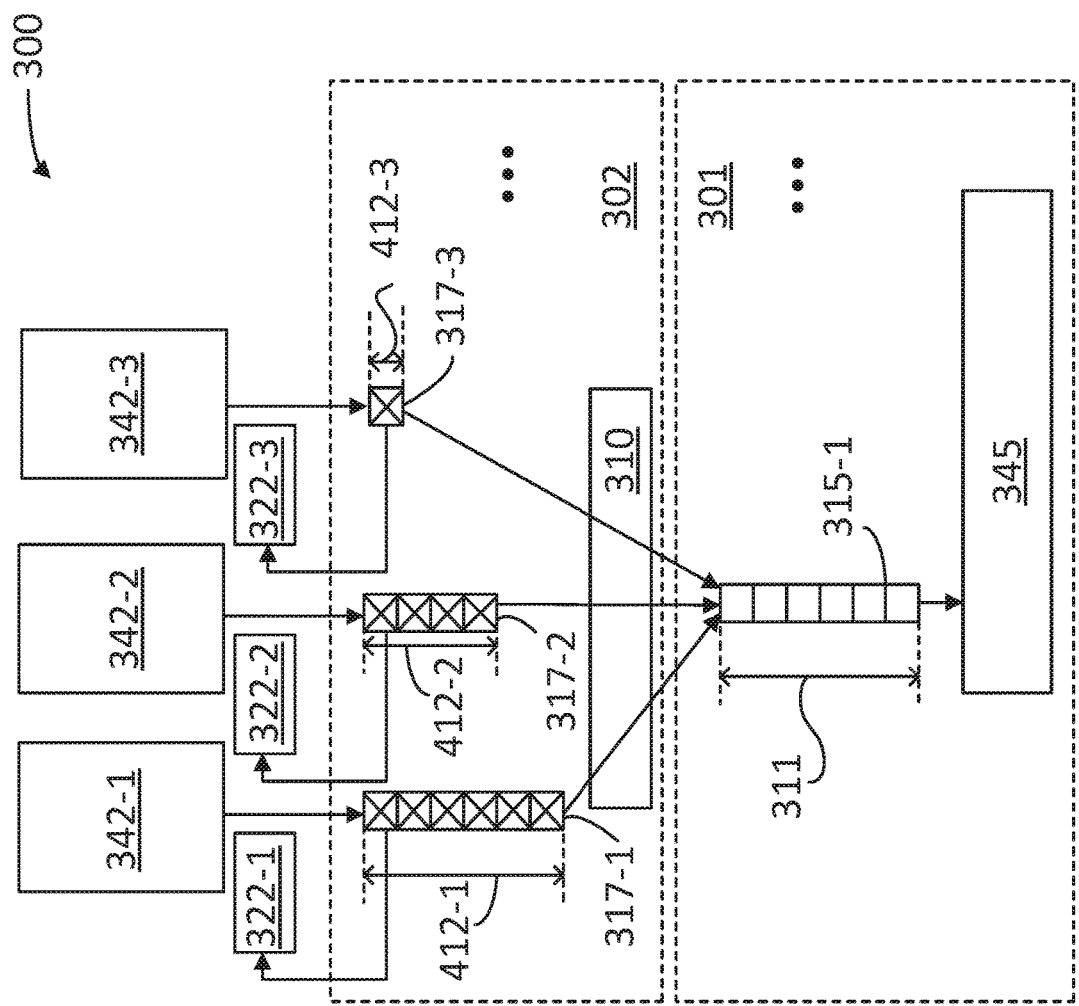
FIG. 4 is a diagram illustrating a dynamic queue depth management in the two-level multi-queue system of FIG. 3, according to some embodiments.

FIG. 4 is a diagram illustrating a dynamic queue depth management in multi-queue system 300, according to some embodiments. For illustrative purposes only, the figure shows software IO queues 317-1, 317-2, and 317-3, which are mapped onto hardware queue 315-1 in hardware layer 301. Accordingly, a similar structure may be discussed for software IO queues 317-4 and 317-5 which are mapped onto hardware queue 315-n, without any loss of generality. In some embodiments, the queue depth 311 of hardware IO queue 315-1 is fixed, as determined by the specification and configuration of NVMe controller 345. Accordingly, multi-queue system 300 dynamically adjusts queue depths 412-1, 412-2, and 412-3 (hereinafter, collectively referred to as "queue depths 412") of software IO queues 317-1, 317-2, and 317-3, respectively. In some embodiments, multi-queue system 300 adjusts queue depths 412 based on the I/O load, as follows.

Software IO queues 317 have the queue depths 412 mapped to hardware IO queue 315-1. In some embodiments, a default configuration in multi-queue system 300 assumes the IO load is distributed equally across software IO queues 317. Assigning a value 'x' to queue depth 412-1, 'y' to queue depth 412-2, and 'z' to queue depth 412-3, a default value for queue depths 412 may be '100.' Without limitation, queue depth 311 of hardware IO queue 315-1 may be fixed at '1000.' Note that, regardless of the initial default assumption, in some embodiments, the condition, x+y+z≤queue depth 311, is observed. After a selected period of time (e.g., k seconds, where k is any pre-selected integer), the load on software IO queues 317-1 and 317-2 may increase to, without limitation and for illustration only, 500 and 400, respectively. Also without limitation and for illustration only, the load on software IO queue 317-3 may be reduced to, for example, 50.

Accordingly, a fail back of IO to applications 342-1 and 342-2 may ensue because the load on software IO queues 317-1 ($Q_1$=500) and 317-2 ($Q_2$=400) is higher than the default value (x=100). On the other hand, software IO queue 317-3 is underutilized, as its queue depth is lower than the default value ($Q_3$=50<100). In some embodiments, multi-queue system 300 is configured to detect, and correct, these inefficiencies and failure risks.

In this scenario, multi-queue system 300 dynamically re-adjusts queue depths 412 to avoid IO failures in applications 342. Multi-queue system 300 is configured to determine a value, 'T,' as the total cumulative IO load of software IO queues 317 mapping to hardware queue 315-1. In some embodiments, multi-queue system 300 determines the value of 'T' with a mathematical expression, as follows $$T=Q_1+Q_2+Q_3 \qquad (1)$$

Multi-queue system 300 also reads a value, 'X,' for the current IO load on each one of software IO queues 317. Multi-queue system 300 also retrieves a value, '$Q_{max}$,' as a maximum queue depth ($Q_{max}$) of hardware IO queue 315-1. Then, multi-queue system 300 adjusts queue depths 412 (Dq) by a factor X/T. In some embodiments, multi-queue system 300 adjusts queue depths 412 with a mathematical expression, as follows $$Dq=(X/T) \cdot Q_{max} \qquad (2)$$

In the above example (e.g., default queue depths 412 of x=100). Over a period of k seconds, the IO load on software IO queues 317-1, 317-2 and 317-3 may be $Q_1$=500 and $Q_2$=400, and $Q_3$=50, respectively. Accordingly, from Eq. 1 we arrive at T=500+400+50=950. Assuming, without limitation, a maximum hardware queue value of, $Q_{max}$=1000, Eq. 2 leads to the following queue depths 412:

$$Dq(412-1)=(500/950)\times 1000=526 \quad (3.1)$$

$$Dq(412-2)=(400/950)\times 1000=421 \quad (3.2)$$

$$Dq(412-3)=(50/950)\times 1000=52 \quad (3.3)$$

Thus, Eqs. 1 and 2 are used to dynamically adjust queue depths 412 according to the IO load. Accordingly, multi-queue system 300 substantially reduces, or avoids altogether, queue full conditions that may lead to IO failures in applications 342. Multi-queue system 300 improves IO performance and efficient utilization of queue depths 412 in OS layer 302, thereby also improving the performance of applications 342, even when a name space is associated with multiple software IO queues 317. In some embodiments, the dynamic queue depth management is performed periodically, assigning queue depths 412 every k seconds, according to IO loads on software IO queues 317. Consistent with embodiments as disclosed herein, any one or all of the above steps (e.g., Eqs. 1, 2 and 3) may be performed at least partially by any one of processors 322.

Figure 5:
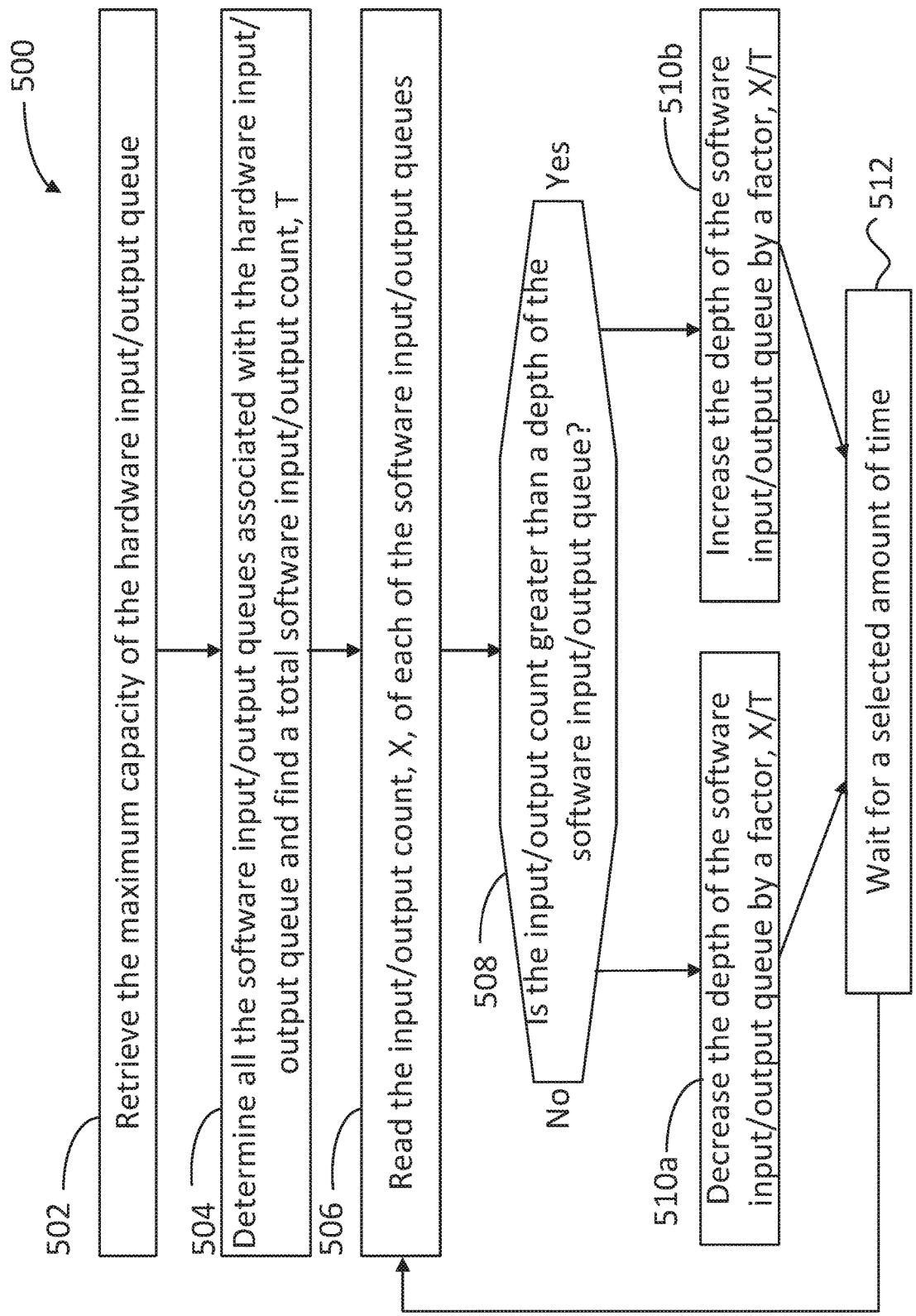
FIG. 5 is a flow chart illustrating steps in a method for dynamically adjusting queue depths in a non-volatile memory environment, according to some embodiments.

FIG. 5 is a flow chart illustrating steps in a method 500 for dynamically adjusting queue depths in a non-volatile memory environment, according to some embodiments. Method 500 may be performed at least partially by any one of a server, VM, or computer communicating with a storage, through a network (e.g., any one of servers 100, storages 101, and network 150). The network may be configured as an NVMeoF, or a DAS network architecture (e.g., architectures 10A and 10B). At least some of the steps in method 500 may be performed by a computer having a host controller interface, and processors running applications (e.g., systems 200 and 300 and device drivers interfaces 210 and 310, CPUs 322, and applications 342). The host controller interface may include a hardware queue having a maximum capacity (e.g., hardware queues 315 and queue depths 311). Further, the processor in the computer may execute instructions for handling the host controller interface, the instructions including forming software queues also having a queue depth (e.g., software queues 317 and queue depths 312 or 412). In some embodiments, the selected queue depths may be adjustable by the processor executing instructions stored in the memory of the computer. In some embodiments, one or more of the steps may be performed out of band of the server, VM, or computer executing method 500, without impacting IO path or using any resource overhead.

Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes retrieving the maximum capacity of the hardware input/output queue.

Step 504 includes determining all the software input/output queues associated with the hardware input/output queue. In some embodiments, step 504 also includes finding a total software input/output count, T, as a sum of the software input/output queues associated with the hardware input/output queue (cf. Eq. 1).

Step 506 includes reading the input/output count, X, for each of the software input/output queues.

Step 508 includes verifying whether the input/output count is greater than the queue depth of the software input/output queue.

Step 510a includes decreasing the queue depth of the software input/output queue by a factor X/T of the maximum capacity of the hardware input/output queue, when the input/output count is lower than the queue depth of the software input/output queue (cf. Eq. 2).

Step 510b includes increasing the queue depth of the software input/output queue by a factor X/T of the maximum capacity of the hardware input/output queue, when the input/output count is greater than the queue depth of the software input/output queue (cf. Eq. 2).

Step 512 includes waiting for a selected amount of time (e.g., k seconds, where k is any integer number) before repeating method 500 from step 506. In some embodiments, step 512 includes waiting for the selected amount of time after adjusting (e.g., increasing/decreasing) the queue depth of the software input/output counter.

Figure 6:
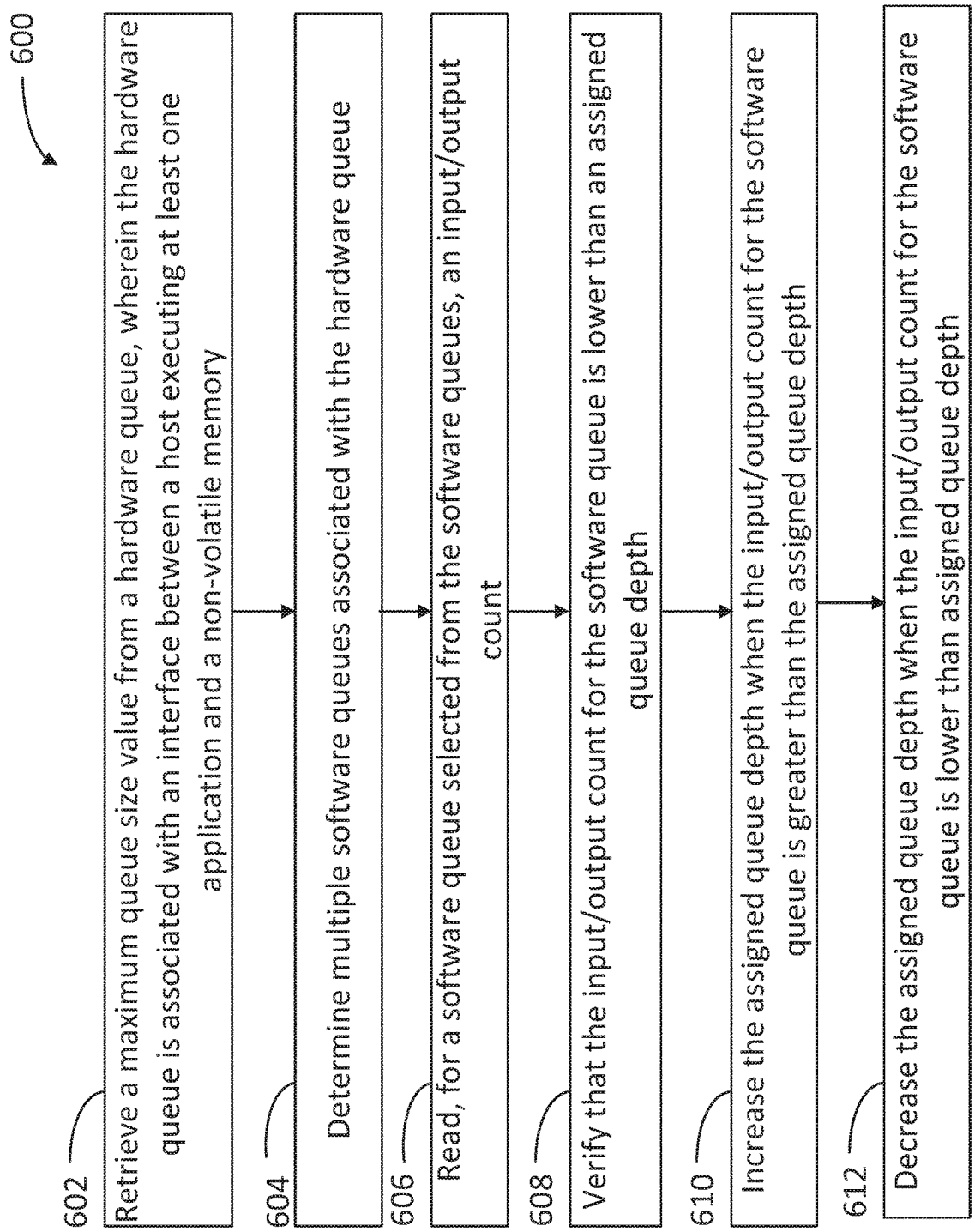
FIG. 6 is a flow chart illustrating steps in a method for adjusting a software queue depth based on an input/output count in a non-volatile memory controller, according to some embodiments.

FIG. 6 is a flow chart illustrating steps in a method 600 for adjusting a software queue depth based on an input/output count in a non-volatile memory controller, according to some embodiments. Method 600 may be performed at least partially by any one of a server, VM, or computer communicating with a storage, through a network (e.g., any one of servers 100, storages 101, and network 150). The network may be configured as an NVMeoF, or a DAS network architecture (e.g., architectures 10A and 10B). At least some of the steps in method 600 may be performed by a computer having a host controller interface, and processors running applications (e.g., systems 200 and 300 and device drivers 210 and 310, CPUs 322, and applications 342). The host controller interface may include a hardware queue having a maximum capacity (e.g., hardware queues 315 and queue depths 311). Further, the processor in the computer may execute instructions for handling the host controller interface, the instructions including forming software queues also having a queue depth (e.g., software queues 317 and queue depths 312 or 412). In some embodiments, the selected queue depths may be adjustable by the processor executing instructions stored in the memory of the computer. In some embodiments, one or more of the steps may be performed out of band of the server, VM, or computer executing method 600, without impacting IO path or using any resource overhead.

Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes retrieving a maximum queue size value from a hardware queue, wherein the hardware queue is associated with an interface between a host executing at least one application and a non-volatile memory.

Step 604 includes determining multiple software queues associated with the hardware queue.

Step 606 includes reading, for a software queue selected from the software queues, an input/output count.

Step 608 includes verifying that the input/output count for the software queue is lower than an assigned queue depth. In some embodiments, step 608 includes decreasing the assigned queue depth when the input/output count for the software queue is lower than the assigned queue depth. In some embodiments, step 608 includes waiting for a pre-selected amount of time before verifying that the input/output count for the software queue is lower than the assigned queue depth.

Step 610 includes increasing the assigned queue depth when the input/output count for the software queue is greater than the assigned queue depth. In some embodiments, step 610 includes determining a dynamic queue depth based on a cumulative input/output count that includes each software queue, on a maximum queue depth of the hardware queue, and on a current load of the software queue, and verifying that the dynamic queue depth is greater than a current queue depth. In some embodiments, step 610 includes updating queue depths for each software queue based on the cumulative input/output count.

Step 612 includes decreasing the assigned queue depth when the input/output count for the software queue is lower than the assigned queue depth.

Hardware Overview

Figure 7:
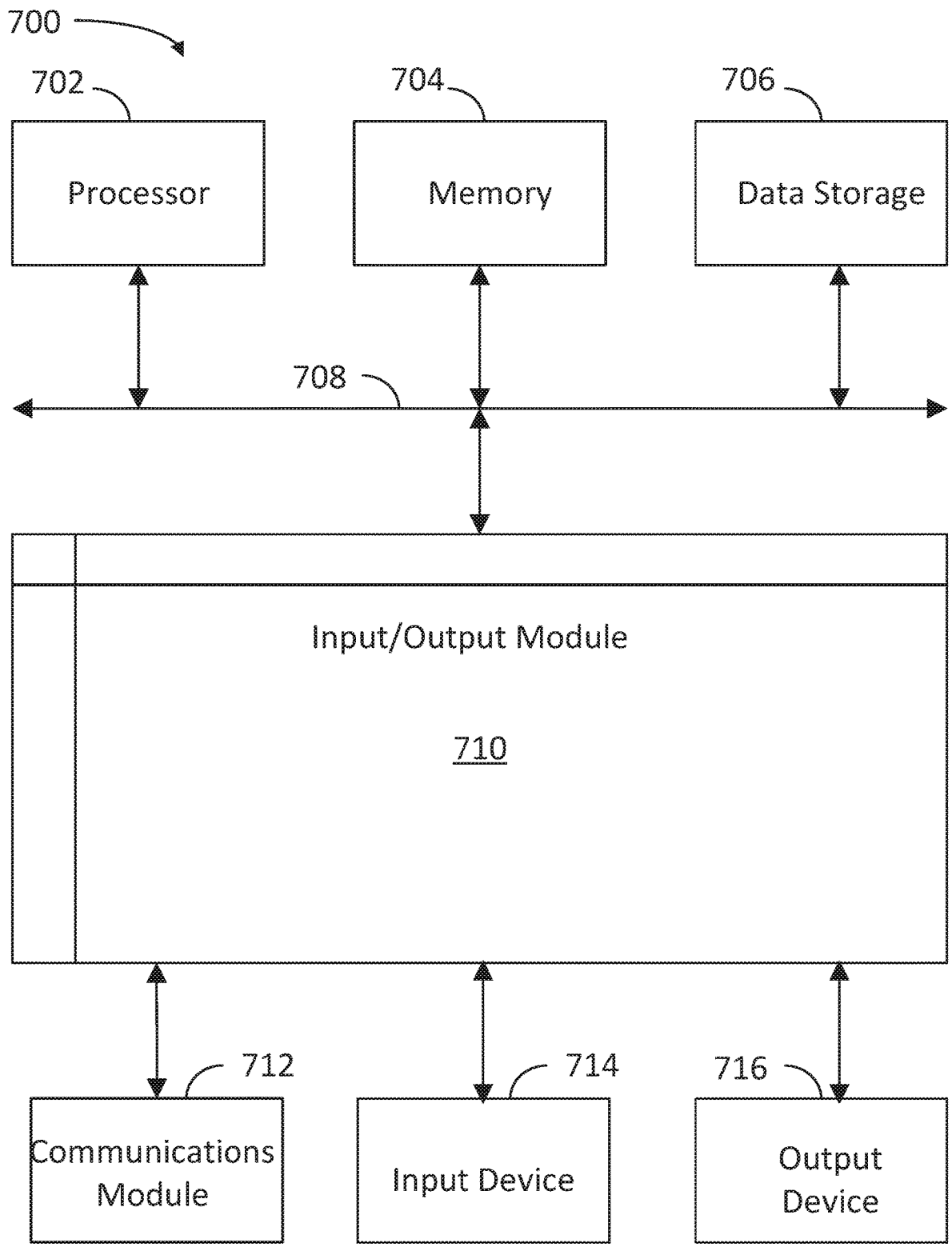
FIG. 7 is a block diagram illustrating an example computer system with which the client and network device of FIG. 1 and the methods of FIGS. 5-6 can be implemented.

FIG. 7 is a block diagram illustrating an exemplary computer system 700 with which the servers 100 of FIG. 1, and the methods of FIGS. 5-6, can be implemented. In certain aspects, the computer system 700 may be implemented using hardware or a combination of software and hardware, either in a dedicated network device, or integrated into another entity, or distributed across multiple entities.

Computer system 700 (e.g., servers 100, and systems 200 and 300) includes a bus 708 or other communication mechanism for communicating information, and a processor 702 (e.g., CPUs 222 and 322) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field-Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., storage 101, memory 330 and NVMe 350), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

A computer program as discussed herein does not necessarily correspond to a file in a file system. A program can be stored in a portion of a file that holds other programs or data (e.g., one or more scripts stored in a markup document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, architecture 10, NVMe controller 200, and multi-queue system 300 can be implemented using a computer system 700 in response to processor 702 executing one or more sequences of one or more instructions contained in memory 704. Such instructions may be read into memory 704 from another machine-readable medium, such as data storage 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a branch office, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 212, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A system comprising:
   a memory;
   a processor;
   an interface to couple a non-volatile memory and the processor; and
   a device driver responsive to commands in the memory to cause the interface and the processor to:
   retrieve a maximum queue size of a hardware queue, wherein the hardware queue is associated with the interface between the processor and the non-volatile memory;
   determine multiple software queues associated with the hardware queue, wherein the maximum queue size is greater than a total input/output count of the multiple software queues;
   read an input/output count for a first software queue selected from the multiple software queues;
   determine whether the input/output count for the first software queue is greater than an assigned queue depth that is assigned to the first software queue based on the maximum queue size, the assigned queue depth representing a number of input/output requests that the first software queue can process; and responsive to determining that the input/output count for the first software queue is greater than the assigned queue depth, increase the assigned queue depth based on combining the input/output count and the maximum queue size, wherein the combining of the input/output count and the maximum queue size comprises multiplying a factor and the maximum queue size, the factor based on the input/output count divided by the total input/output count of the multiple software queues.

2. The system of claim 1, wherein the first software queue is associated with a namespace including multiple logical blocks, each logical block of the multiple logical blocks having a memory address in the non-volatile memory.

3. The system of claim 1, wherein the first software queue is associated with multiple namespaces, each namespace of the multiple namespaces including multiple logical blocks, and each logical block of the multiple logical blocks having a memory address in the non-volatile memory.

4. The system of claim 1, comprising:
a plurality of processors, wherein the first software queue is associated with one of the plurality of processors.

5. The system of claim 1, wherein the first software queue is associated with a virtual machine.

6. The system of claim 1, wherein the processor is a node in a cluster environment, and the interface is shared between multiple nodes in the cluster environment.

7. The system of claim 1, wherein the device driver is to cause the interface and the processor to assign, according to a default configuration, a same queue depth to each of the multiple software queues.

8. The system of claim 1, wherein the hardware queue has a fixed queue depth.

9. The system of claim 1, further comprising multiple hardware queue depths associated with multiple namespaces in the non-volatile memory.

10. The system of claim 1, wherein the device driver is part of an operating system (OS) layer of the system, and the interface and the hardware queue are part of a hardware layer of the system, the hardware layer further comprising a non-volatile memory controller for the non-volatile memory, and wherein the device driver is to direct the multiple software queues to the hardware queue.

11. The system of claim 1, wherein the device driver is responsive to the commands in the memory to cause the interface and the processor to:
responsive to determining that the input/output count for the first software queue is lower than the assigned queue depth, decrease the assigned queue depth based on combining the input/output count and the maximum queue size.

12. A method of a computer system, comprising:
receiving a maximum queue size of a hardware queue, wherein the hardware queue is associated with an interface between a non-volatile memory and a host executing an application;
determining multiple software queues associated with the hardware queue; wherein the maximum queue size is greater than a total input/output count of the multiple software queues;
receiving, for a first software queue of the multiple software queues, an input/output count representing a quantity of input/output requests in the first software queue;
determining whether the input/output count for the first software queue is greater than an assigned queue depth that is assigned to the first software queue based on the maximum queue size, the assigned queue depth representing a number of input/output requests that the first software queue can process; and
responsive to determining that the input/output count for the first software queue is greater than the assigned queue depth, increasing the assigned queue depth based on combining the input/output count and the maximum queue size, wherein the combining of the input/output count and the maximum queue size comprises multiplying a factor and the maximum queue size, the factor based on the input/output count divided by the total input/output count of the multiple software queues.

13. The method of claim 12, comprising:
responsive to determining that the input/output count for the first software queue is lower than the assigned queue depth, decreasing the assigned queue depth based on combining the input/output count and the maximum queue size.

14. The method of claim 12, further comprising updating the total input/output count based on a modification of queue depths for the multiple software queues.

15. A non-transitory computer-readable medium storing instructions that when executed cause a computer to:
receive a maximum queue size of a hardware queue in a hardware layer, wherein the hardware queue is part of a memory controller for a non-volatile memory;
determine multiple software queues mapped to the hardware queue, wherein the maximum queue size is greater than a total input/output count of the multiple software queues;
receive, for a first software queue of the multiple software queues, an input/output count representing a quantity of input/output requests in the first software queue;
determine whether the input/output count for the first software queue is less than an assigned queue depth that is assigned to the first software queue based on the maximum queue size, the assigned queue depth representing a number of input/output requests that the first software queue can process; and
responsive to determining that the input/output count for the first software queue is less than the assigned queue depth, decrease the assigned queue depth based on combining the input/output count and the maximum queue size, wherein the combining of the input/output count and the maximum queue size comprises multiplying a factor and the maximum queue size, the factor based on the input/output count divided by the total input/output count of the multiple software queues.

16. The non-transitory computer-readable medium of claim 15, wherein the instructions when executed cause the computer to:
responsive to determining that the input/output count for the first software queue is greater than the assigned queue depth, increase the assigned queue depth based on combining the input/output count and the maximum queue size.

* * * * *